United States Patent
Tilley et al.

(10) Patent No.: US 6,296,207 B1
(45) Date of Patent: Oct. 2, 2001

(54) COMBINED STATIONKEEPING AND MOMENTUM MANAGEMENT

(75) Inventors: Scott W Tilley, Belmont; Darren R Stratemeier, Redwood City, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/238,339

(22) Filed: Jan. 27, 1999

(51) Int. Cl.$^7$ ....................................... B64G 1/26
(52) U.S. Cl. ............................. 244/169; 244/165
(58) Field of Search ...................... 244/172, 164, 244/165, 169, 158 R, 170; 364/459

(56) References Cited

U.S. PATENT DOCUMENTS

| | | | |
|---|---|---|---|
| 4,288,051 | * | 9/1981 | Goschel . |
| 4,294,420 | * | 10/1981 | Broquet . |
| 5,349,532 | | 9/1994 | Tilley et al. ................. 364/459 |
| 5,443,231 | * | 8/1995 | Aznel . |
| 5,826,830 | * | 10/1998 | Abernethy . |
| 5,984,236 | * | 11/1999 | Keitel et al. . |
| 6,015,116 | * | 1/2000 | Anzel et al. . |
| 6,032,904 | * | 3/2000 | Hosick et al. . |

FOREIGN PATENT DOCUMENTS

| | | |
|---|---|---|
| 0 499 815 A1 | 8/1992 | (EP) . |
| 0 780 299 A1 | 6/1997 | (EP) . |
| 0 818 721 A1 | 1/1998 | (EP) . |
| 0 937 644 A2 | 8/1999 | (EP) . |

OTHER PUBLICATIONS

Stationkeeping the Hughes HS 702 Satellite With a Xenon Ion Propulsion System, pp. 1–14.

* cited by examiner

*Primary Examiner*—Charles T. Jordan
*Assistant Examiner*—Tien Dinh
(74) *Attorney, Agent, or Firm*—Perman & Green, LLP (57) ABSTRACT

There is provided a method and system for simultaneous north-south stationkeeping and 3-axis momentum management for a geosynchronous orbiting spacecraft. The spacecraft has a first thruster, a second thruster, and at least three momentum wheels mounted on-board the spacecraft. The first and second thrusters are mounted adjacent to a north and a south face of the spacecraft, respectively, on an anti-earth side of the spacecraft and are aligned to produce thrust vectors slightly off from the spacecraft's center of mass. The first and second thrusters are independently fired at predetermined positions along the geosynchronous orbital path of the spacecraft. The thrust vectors provide attitude and orbital adjustment needed to correct north-south orbital position deviation and provide torque needed to desaturate the stored angular momentum of the momentum wheels.

12 Claims, 7 Drawing Sheets

COMBINED STATIONKEEPING AND MOMENTUM MANAGEMENT

FIELD OF THE INVENTION

The present invention relates generally to spacecraft attitude control and momentum management, and specifically to a system and method of simultaneously performing north-south stationkeeping maneuvers and 3-axis momentum management.

BACKGROUND OF THE INVENTION

It is important, in a geosynchronous communication spacecraft, to control the spacecraft's attitude in order to orient communication hardware relative to a planetary location. It is also important for momentum stored in a momentum wheel stabilization system of the spacecraft to be periodically unloaded or desaturated. Mechanisms to accomplish attitude correction and momentum desaturation ensure the geosynchronous spacecraft is kept on-station.

Several mechanisms are used by orbiting spacecraft for stationkeeping, attitude control and momentum desaturation. Typically, bi-propellant chemical thrusters are used to take a spacecraft from a transfer orbit to a synchronous orbit. The bi-propellant thrusters could also be used for stationkeeping, but such thrusters produce relatively powerful disturbance torques due to thruster misalignment, center of mass offsets, and plume impingements. As a result, the bi-propellant thrusters are not preferred for the fine adjustments which are typically made during stationkeeping maneuvers, attitude control, and momentum desaturation.

Alternatively, a spacecraft may use magnetic torquers for attitude control and momentum desaturation. In operation, magnetic torquers alter a spacecraft's attitude by applying the force of an electric coil's dipole moment with respect to the earth's magnetic field. However, magnetic torquers are not preferred for stationkeeping for they produce torque without lateral force. There are other disadvantages associated with the use of magnetic torquers in orbiting spacecraft. By example, magnetic torquers are heavy, provide little control power, and cannot be used to control the pitch attitude of the spacecraft due to the alignment of the dipole moment section with the magnetic field of the earth.

Conventional orbiting spacecraft may employ additional techniques for stationkeeping, attitude control, and momentum desaturation. The additional techniques include, for example, the use of ion propulsion thrusters. In fact, ion propulsion thrusters are particularly desirable for north-south stationkeeping on spacecraft with long mission lifetimes. However, a disadvantage of ion propulsion thrusters is their weight. Also, as with bi-propellant thrusters, the ion propulsion thrusters may produce disturbance torques on the spacecraft resulting in undesirable attitude motion.

It can be appreciated that in addition to the undesirable attitude motion caused by the conventional stationkeeping, attitude control and momentum desaturation techniques discussed above, undesirable attitude motion may also be caused by solar pressure imparted upon the orbiting spacecraft.

Momentum wheel stabilization systems are commonly used to counteract sources of disturbance torque. Typically, such stabilization systems include one or more momentum wheels and control loops to sense changes in the spacecraft's attitude. Sensors on the spacecraft may detect deviations on any of three orthogonal spacecraft axes; the x-axis (roll), the y-axis (pitch), or the z-axis (yaw). The control loops determine the required speed of the wheels to absorb pitch and yaw momentum based on the sensed attitude. Commonly, yaw and pitch momentum are absorbed directly by the momentum wheels, while roll momentum is absorbed as a change in yaw body angle which results from cross-coupling dynamics of momentum biased spacecraft. However, the roll momentum can be stored in the wheels if the wheel system design permits.

As was stated above, momentum stored in the momentum wheels must be periodically relieved, or desaturated. Desaturation is required in order to keep the momentum wheels within a predetermined speed range. Desaturation is typically accomplished by applying an external torque to the spacecraft through chemical propulsion thrusting or magnetic torquing. The external torque is applied to counteract, and thus reduce the stored momentum. However, chemical propulsion thrusting is not preferred for maintaining highly accurate spacecraft attitude during stationkeeping maneuvers because of the inherit disturbance torques introduced. Magnetic torques cannot be produced parallel to the magnetic field vector.

U.S. Pat. No. 5,349,532 Tilley et al. disclose a system and method to maintain a desired spacecraft attitude and unload accumulated momentum while performing north-south stationkeeping maneuvers. Tilley et al. disclose a device for sensing the spacecraft's position, attitude, and stored wheel momentum, and a device for determining the torques required to produce the desired attitude for the spacecraft and desaturate the momentum wheels. Tilley et al. teach in one embodiment the use of ion propulsion thrusters which are gimballed and throttled to produce the desired torques. Ideally, a spacecraft's stationkeeping and momentum management system would operate so as to maximize fuel efficiency during the mission lifetime, without sacrificing reliability. The inventors have determined that this goal would be realized with a system for simultaneously maintaining the spacecraft's stationkeeping maneuvers and momentum management, which employs a thruster firing cycle wherein thrusters are independently fired at predetermined locations along the spacecraft's orbit.

OBJECTS AND ADVANTAGES OF THE INVENTION

It is a first object and advantage of this invention to provide a system and method that simultaneously performs a spacecraft's north-south stationkeeping maneuvers and 3-axis momentum management.

It is another object and advantage of this invention to provide a system and method that simultaneously performs a spacecraft's north-south stationkeeping maneuvers and 3-axis momentum management, without the use of magnetic torquers, where one of a pair of thrusters is fired at predetermined locations along the spacecraft's orbital path.

It is another object and advantage of this invention to provide a system and method that simultaneously performs a spacecraft's north-south stationkeeping maneuvers and 3-axis momentum management by independently firing one of a pair of thrusters, thus reducing the spacecraft's power consumption.

Further objects and advantages of this invention will become more apparent from a consideration of the drawings and ensuing description.

SUMMARY OF THE INVENTION

The foregoing and other problems are overcome and the objects and advantages are realized by methods and methods and apparatus in accordance with embodiments of this invention, wherein simultaneous north-south stationkeeping and 3-axis momentum management is provided for a spacecraft, such as a geosynchronous orbiting spacecraft.

In the present invention, a method of simultaneous north-south stationkeeping and 3-axis momentum management for a geosynchronous orbiting spacecraft having a first thruster, a second thruster, and at least three momentum wheels mounted on-board the spacecraft is disclosed. In a first-pass of a thruster firing cycle, the method includes steps of: firing the first thruster at a first point along an orbital path of the spacecraft; and firing the second thruster at a second point along the orbital path of the spacecraft, where a thrust vector at the second point is non-parallel with a thrust vector at the first point. In a second-pass of the thruster firing cycle, the method fires the first thruster at a third point along the orbital path of the spacecraft, where a thrust vector at the third point is parallel with and on an opposite side of the orbital path from the thrust vector at the second point. The second-pass further includes firing the second thruster at a fourth point along the orbital path of the spacecraft, where a thrust vector at the fourth point is parallel with and on an opposite side of the orbital path from the thrust vector at the first point. When the first and the second thrusters are fired over the four points described previously on the orbital path, the radial components of a change in velocity produced by firing the first and the second thrusters are cancelled, and angular momentum stored in the at least three momentum wheels is desaturated.

In one embodiment, the first-pass and the second-pass of the thruster firing cycle are performed over two spacecraft orbits. Additionally, the angular momentum stored in the at least three momentum wheels is desaturated by firing, at a given time, a single thruster to decrease the speed of the at least three momentum wheels along a respective orthogonal spacecraft axis.

In another embodiment, the method includes initial steps of: defining a point A along an orbital path of the spacecraft where the orbital path crosses a line of nodes coplanar with a z-axis of the spacecraft; and defining a point B along the orbital path of the spacecraft where the orbital path crosses the line of nodes and wherein the point B is oriented 180° from the point A. In the another embodiment a first-pass of a thruster firing cycle includes a step of firing the first thruster at a point A' along the orbital path of the spacecraft, where the point A' is a first predetermined angle from the point A. The first-pass also includes a step of firing the second thruster at a point B' along the orbital path of the spacecraft, where the point B' is a second predetermined angle from the point B and a second predetermined time of motion from the point A', and where the point B' is non-collinear with the point A' and the earth's center, i.e. a point O.

In a second-pass of the thruster firing cycle of the another embodiment, the method further includes a step of firing the first thruster at a point A" along the orbital path of the spacecraft, where the point A" is a third predetermined angle from the point A and a third predetermined time of motion from the point B', and where the point A" is collinear with and on an opposite side of the orbital path from the point B' and the earth's center at the point O. The second-pass also includes a step of firing the second thruster at a point B" along the orbital path of the spacecraft, where the point B" is a fourth predetermined angle from the point B and a fourth predetermined time of motion from the point A", and where the point B" is collinear with and on an opposite side of the orbital path from the point A' and the earth's center at the point O.

Preferably, values of the first, the second, the third and the fourth predetermined angles and the second, the third and the fourth predetermined times of motion within the thruster firing cycle are programmable. In one embodiment, the programmable values are transmitted to the spacecraft by ground command from a ground station. For example, the first predetermined angle is about 15°, and about 1 hour of orbital motion at geosynchronous altitude, from the point A; the second predetermined angle is about 15° from the point B and the second predetermined time of motion is about 10 hours from the point A'; the third predetermined angle is about 15° from the point A in a direction opposite the point A' and the third predetermined time of motion is about 12 hours from the point B'; and the fourth predetermined angle is about 15° from the point B in a direction opposite the point B', and the fourth predetermined time of motion is about 14 hours from the point A".

Additionally, the present invention discloses a system for simultaneous north-south stationkeeping and 3-axis momentum management for a geosynchronous orbiting spacecraft that operates in accordance with the foregoing methods. The spacecraft has a center of mass, a north face, a south face and an anti-earth side facing opposite earth during the geosynchronous orbit. The system includes a first thruster mounted on the anti-earth side of the spacecraft and adjacent to the north face of the spacecraft. The first thruster is aligned to produce a first thrust vector nearly through the center of mass. The system also includes a second thruster mounted on the anti-earth side of the spacecraft and adjacent to the south face of the spacecraft. The second thruster is aligned to produce a second thrust vector nearly through the center of mass.

Also included in the system are at least three momentum wheels. The momentum wheels are mounted on-board the spacecraft for maintaining an orbital attitude of the spacecraft with respect to a corresponding one of three spacecraft axes, and in a non-planar manner such that angular momentum of the corresponding one of the three spacecraft axes is independently stored in at least one of the at least three momentum wheels. The angular momentum stored in each of the momentum wheels is desaturated by firing, at a given time, a single one of the first or the second thrusters to release the stored angular momentum.

The system further includes a controller that determines an attitude adjustment in the north-south direction of the geosynchronous orbit of the spacecraft. The controller produces an attitude adjustment control signal. The controller also determines if any of the at least three momentum wheels are saturated. In response to this determination, the controller produces a desaturation control signal. Preferably, the first thruster and the second thruster are responsive to the attitude adjustment control signal and the desaturation control signal for maintaining a predetermined orbital position along the geosynchronous orbital path of the spacecraft.

BRIEF DESCRIPTION OF THE DRAWINGS

The above set forth and other features of the invention are made more apparent in the ensuing Detailed Description of the Invention when read in conjunction with the attached Drawings, wherein.

Identically labelled elements appearing in different ones of the above described figures refer to the same elements but may not be referenced in the description for all figures.

DETAILED DESCRIPTION OF THE INVENTION

Figure 1:
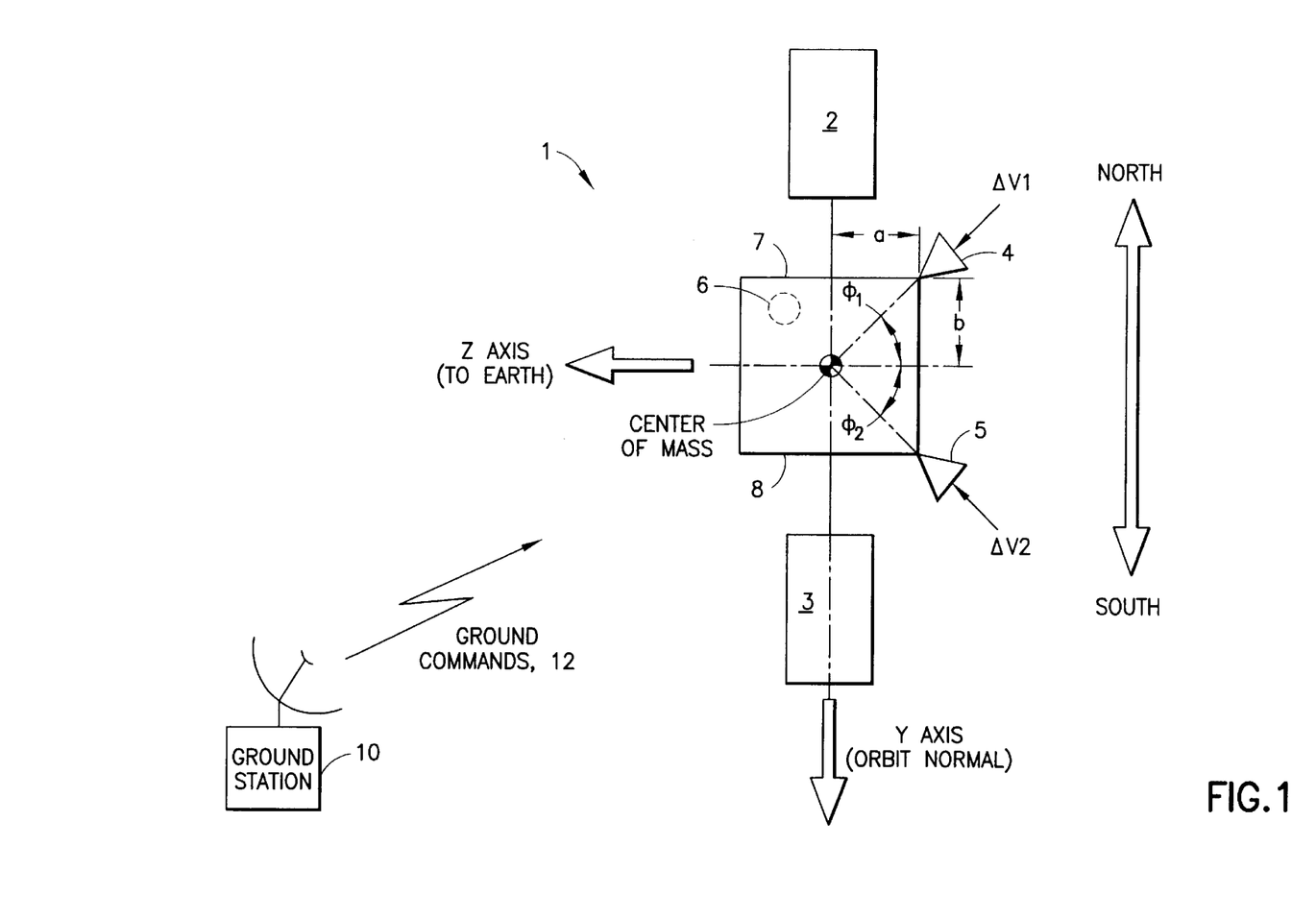
FIG. 1 is a block diagram of a spacecraft configuration according to the present invention.

FIG. 1 illustrates an exemplary embodiment of a spacecraft 1 suitable for being placed in a geosynchronous orbit about the earth. The spacecraft 1 includes a north solar array 2, a south solar array 3, a first thruster 4, a second thruster 5, and at least three momentum wheels, for example, a momentum wheel 6. The at least three momentum wheels are mounted on-board the spacecraft 1 for maintaining the spacecraft's attitude with respect to a particular axis. In accordance with an aspect of this invention the at least three momentum wheels are not coplanar; thus momentum of the three spacecraft axes, the x-axis (roll), the y-axis (pitch), or the z-axis (yaw), can be stored independently in the at least three momentum wheels. Preferably, the total number of momentum wheels mounted on-board the spacecraft 1 are determined by reliability and mission requirements.

In conventional systems, the spacecraft 1 operates in one of two modes. In a first mode, the spacecraft 1 performs its intended mission, i.e. the purpose in which it was deployed, for example, to operate as a communication satellite. In a second mode, the spacecraft 1 performs any necessary attitude control or stationkeeping maneuvers required to maintain the spacecraft's geosynchronous orbital position. The teaching of this invention is intended to address the operation of the spacecraft 1 during the second mode.

It can be appreciated that the determination to enter the second mode and to perform attitude control or stationkeeping maneuvers can be initiated by logic devices and sensors located on-board the spacecraft 1, or alternatively, by command from a ground station 10. In one embodiment of the present invention the ground station 10 transmits ground commands 12 to the spacecraft 1 that instruct the spacecraft 1 to enter the second mode. Additionally, the ground commands 12 may include certain parameters, as will be discussed below, that are employed during the attitude control or the stationkeeping maneuvers.

In order to maintain a desired geosynchronous orbital attitude, periodic spacecraft attitude correction is required. In particular, the momentum wheels are used to compensate for any disturbance torque along the three orthogonal axes of the spacecraft 1. Over time, the momentum wheels are eventually forced into saturation, and thus can not operate to maintain the orbital attitude. Before saturation occurs, the momentum wheels are desaturated. The desaturation is performed, in accordance with the present invention, by firing, at a given time in conjunction with stationkeeping activity, one of a pair of thrusters. The firing of the thruster is such that it subtracts from the angular momentum of the momentum wheels, and the thruster firings decrease the speed of the wheels along a respective orthogonal spacecraft axis to achieve the desaturation of the momentum wheels. Additionally, the thrusters may be fired independently from the desaturation process to compensate for deviations along an axis.

As illustrated in FIG. 1, a first thruster 4 and a second thruster 5 are mounted on an anti-earth side of the spacecraft 1, i.e. on the side opposite the earth during orbit. The first thruster 4 and the second thruster 5 are aligned to each deliver a thrust vector slightly off from the spacecraft's center of mass. That is, the thrusters 4 and 5 each deliver a thrust vector at an angle of $\Phi_1$ and $\Phi_2$ respectively, between the spacecraft y and z axes. Also, the first thruster 4 is mounted adjacent to the spacecraft's north face 7, while the second thruster 5 is mounted adjacent to the spacecraft's south face 8. When either the first thruster 4 or the second thruster 5 is fired a resulting change of velocity, $\Delta V1$ or $\Delta V2$ respectively, is realized. The change of velocity is represented by a component in two of the three orthogonal spacecraft axes, i.e. the y-axis (pitch) and the z-axis (yaw). These components are discussed in detail below.

It can be appreciated that if the thrusters 4 and 5 were aligned such that the thrust vectors $\Delta V1$ and $\Delta V2$ were directed through the center of mass (i.e., $\Phi_1=\Phi_2=45°$ when a=b) no torque on the spacecraft 1 is produced.

Therefore, by misaligning the thrusters 4 and 5 such that the thrust vectors are directed slightly off from the center of mass, torque is created in a direction perpendicular to the applied thrust to desaturate wheel momentum stored in the perpendicular direction. The magnitude of the momentum dumped, i.e. desaturated, can be determined by measuring a time period during which the misaligned thrusters were fired since momentum is represented by a product of torque multiplied by the time period.

Figure 2:
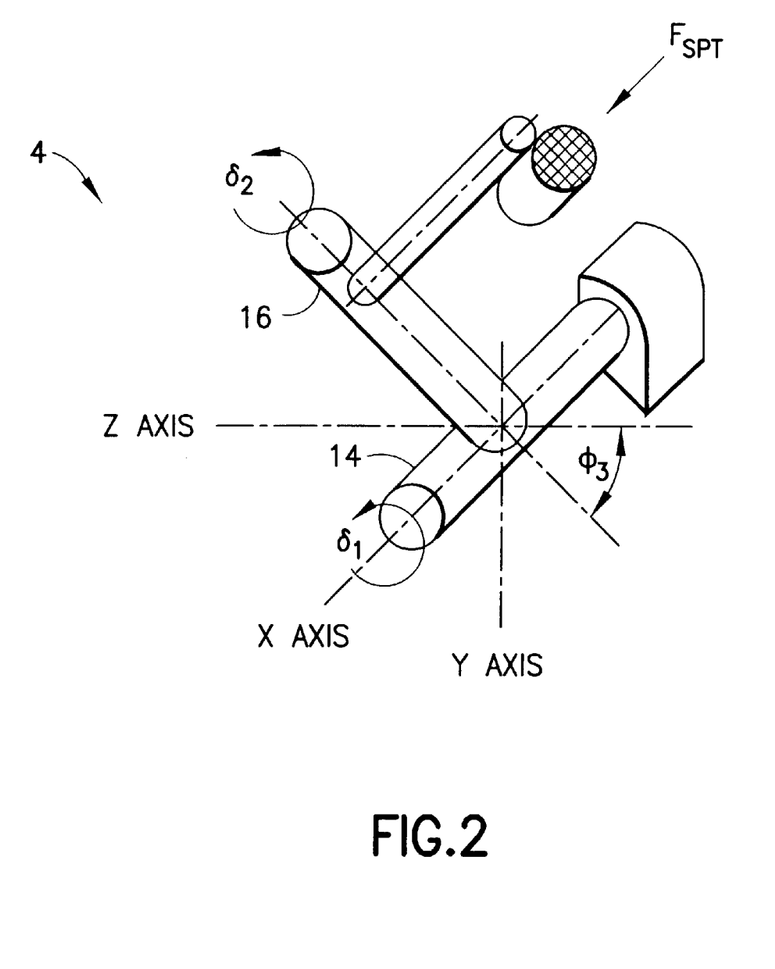
FIG. 2 is a block diagram which illustrates a gimballed mounting of a thruster to the spacecraft of FIG. 1.

In FIG. 2, a detailed block diagram of the thruster 4 is shown. As depicted in FIG. 2, the thruster 4 is gimballed to enable desaturation of the roll momentum (i.e., momentum in the spacecraft x axis) and of the combined pitch/yaw momentum (i.e., momentum in the combined spacecraft y and z axes). A first gimbal 14 rotates about the spacecraft's x axis to generate a roll torque $T_X$. The rotation of the first gimbal 14 is illustrated in FIG. 2 as $\delta_1$. A second gimbal 16 rotates about an axis that is defined about a 45° angle $\Phi_3$ between the spacecraft's y and z axes. The second gimbal 16 generates a pitch/yaw torque $T_{y/z}$. The rotation of the second gimbal 16 is illustrated in FIG. 2 as $\delta_2$.

Assuming that the thruster 4 is fired through the spacecraft's center of mass (i.e. $\Phi_1=45°$), the radius $\Delta r$ can be represented by the hypothenuse of a right triangle formed from $\Delta r$ and sides a and b (FIG. 1). Assuming, for example, that the sides a and b are each 1.7 m in length, the radius $\Delta r$ is calculated as:

$$\Delta r = \sqrt{2*(1.7)^2}$$

$$\Delta r = 1.7*\sqrt{2} \qquad (1)$$

The thrusters 4 and 5 are fired and velocity vectors are directed, in accordance with the present invention, slightly off from the center of mass to include an angular offset $\Delta \Phi$, for example, 1° per north-south station keeping maneuver, or, in radians, 1°/57.3. Assuming a thruster firing force of, for example, 0.08 N, the magnitude of the roll torque $T_X$ is defined as:

$$T_x = F_{SPT} * \Delta r * \Delta \Phi$$

$$T_x = 0.08 \text{ N} * (1.7 \text{ m} * \sqrt{2}) * 1°/57.3 \quad (2)$$

So, $T_x = 3.4 \times 10^{-3}$ Nm per 1° of $\delta_1$.

Similarly, the magnitude of the pitch/yaw torque $T_{y/z}$ is defined as:

$$T_{y/z} = F_{SPT} * \Delta r * \Delta \Phi$$

$$T_{y/z} = 0.08 \text{ N} * (1.7 \text{ m} * \sqrt{2}) * 1°/57.3 \quad (3)$$

So, $T_{y/z} = 3.4 \times 10^{-3}$ Nm per 1° of $\delta_2$.

It should be appreciated that the thruster 5 is also gimballed to enable desaturation of the roll momentum and of the combined pitch/yaw momentum.

Figure 7:
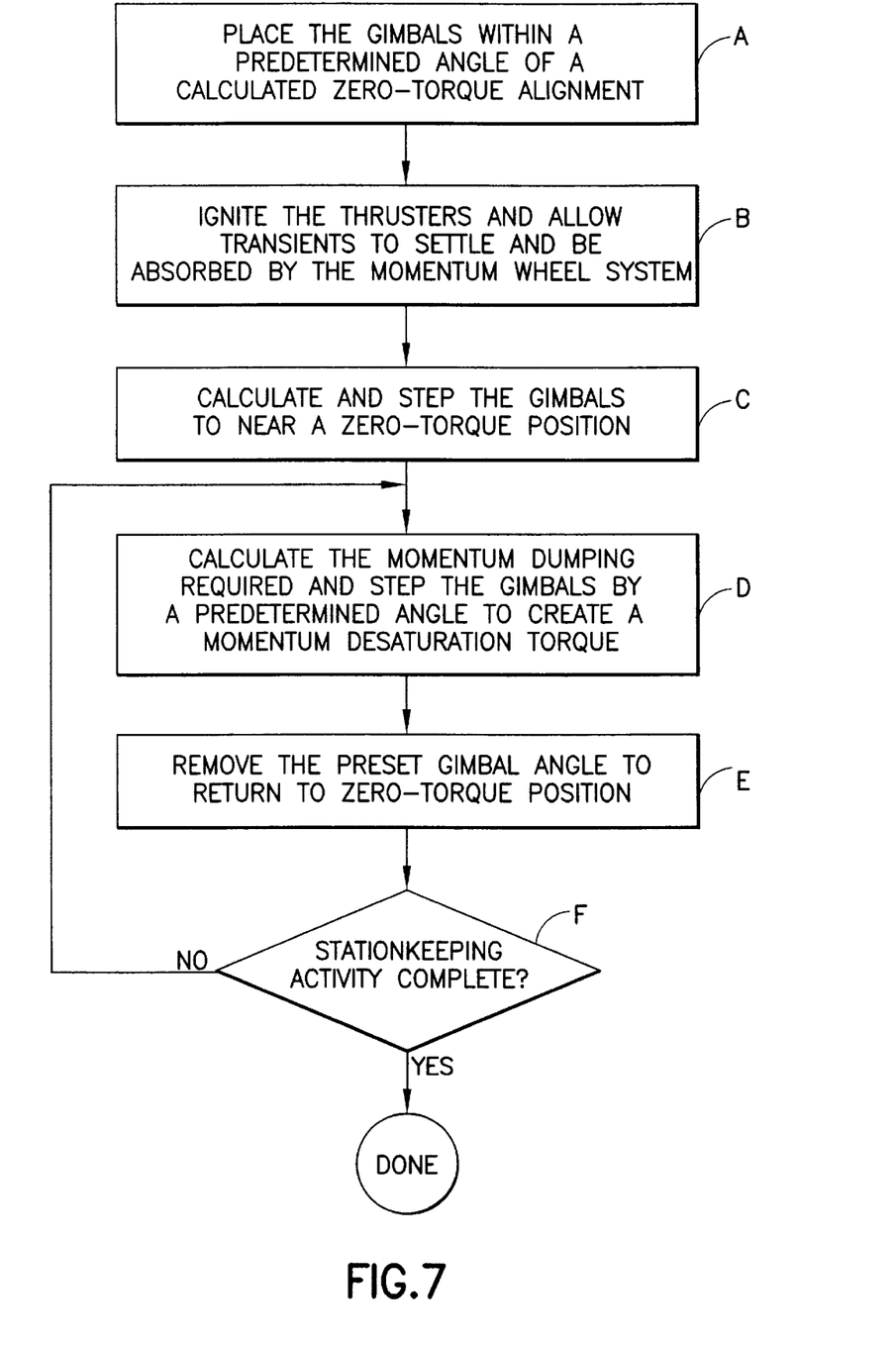
FIG. 7 is a logic flow diagram depicting a method of thruster firing in order to dump a desired amount of stored momentum.

In one aspect of the present invention, the thruster 4 or 5 is fired over a predetermined time frame of, for example, about 24.5 minutes, according to a series of method steps, in order to dump a specified amount of stored momentum, for example, about 2.5 Nms of stored momentum. Referring also to FIG. 7, the series of method steps are as follows.

Step A places the gimbals (e.g., gimbals 14 and 16 when thruster 4 is to be fired) within a predetermined angle of a (ground) calculated zero-torque alignment (hereinafter referred to as a preset gimbal angle).

Step B ignites the thrusters and allows transients to settle and be absorbed by the momentum wheel system.

Step C calculates and steps the gimbals to near a zero-torque position.

Step D calculates the momentum dumping required and steps the gimbals by a predetermined angle to create a momentum desaturation torque for a variable time period (e.g., time period length * torque=momentum dumped).

Step E removes the preset gimbal angle to return to the zero-torque position.

Step F repeats Steps D and E as needed, until the stationkeeping activity is complete and the thrusters are off. Preferably there is not more than one such series executed per hour.

In one embodiment, the preset gimbal angle is preferably about 0.5° and the predetermined angle for stepping the gimbals is about 0.01°. These values can be substituted into Equations 2 and 3 to yield the roll torque $T_x$ and the pitch/yaw torque $T_{y/x}$ generated for each north-south stationkeeping maneuver with a 0.5° gimbal offset.

$$T_x = F_{SPT} * \Delta r * \Delta \Phi$$

$$T_x = 0.08 \text{ N} * (1.7 \text{ m} * \sqrt{2}) * 0.5°/57.3 \quad (4)$$

So, $T_x = 0.0017$ Nm per 0.5° of $\delta_1$ and the pitch/yaw torque $T_{y/z}$ is calculated as:

$$T_{y/z} = F_{SPT} * \Delta r * \Delta \Phi$$

$$T_{y/z} = 0.08 \text{ N} * (1.7 \text{ m} * \sqrt{2}) * 0.5°/57.3 \quad (5)$$

The resulting pitch/yaw torque is, $T_{y/z} = 0.0017$ Nm per 0.5° of $\delta_2$. Since the momentum dumped is determined by the formula: torque * time period, each north-south station keeping maneuver performed with a time period of at least 1470 seconds or about 24.5 minutes can desaturate 2.5 Nms in the roll and pitch/yaw axes of the wheels.

Figure 3:
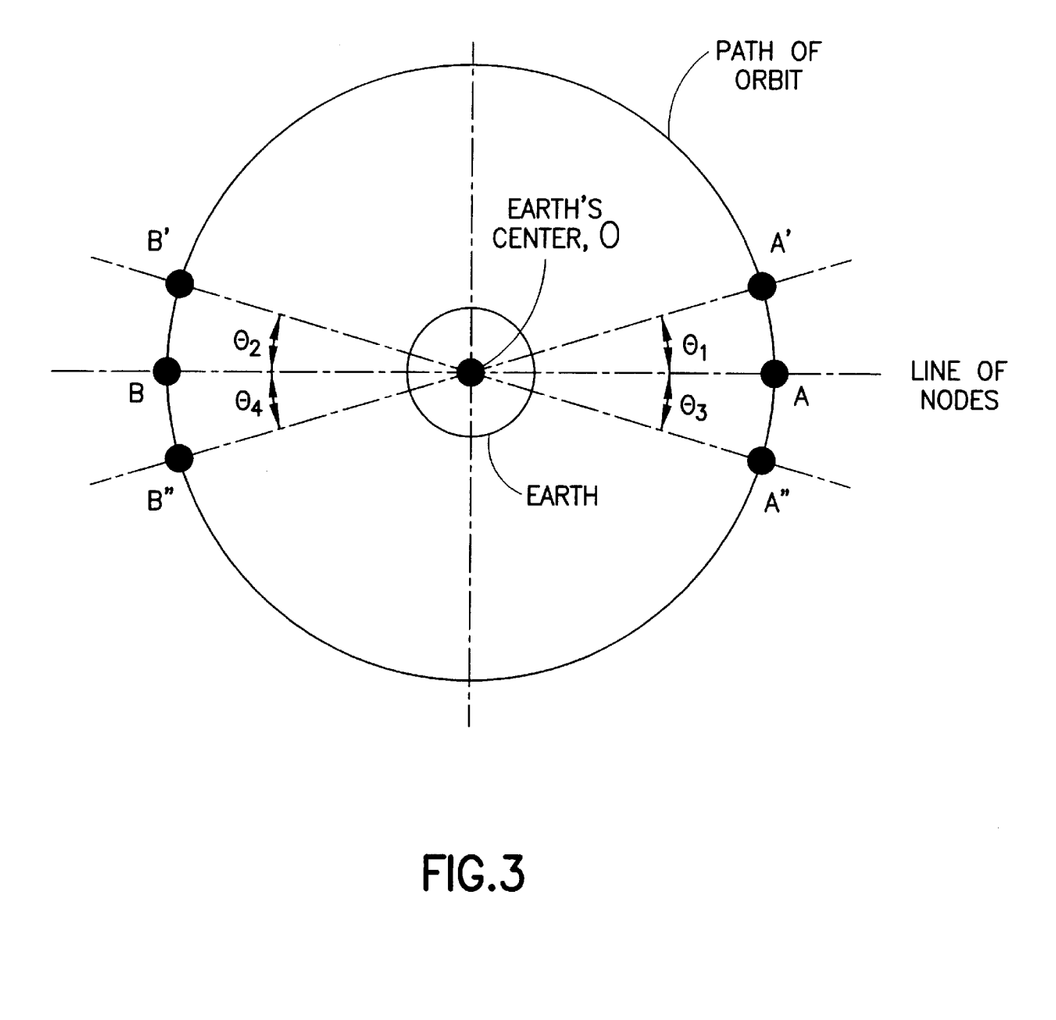
FIG. 3 is a plan view of a spacecraft's geosynchronous orbit about the earth in accordance with the present invention.

In addition to the influences of torque and the duration of firing time, the amount of momentum desaturated is also influenced by the firing cycle of the thrusters 4 and 5. As shown in FIG. 3, the first thruster 4 and the second thruster 5 are separately fired at predetermined intervals along the spacecraft's geosynchronous orbital path about the earth.

The firing of the first thruster 4 is represented by a point A along the spacecraft's path of orbit. Similarly, a predetermined firing of the second thruster 5 is represented by a point B. The points A and B represent points where the spacecraft's geosynchronous orbital path crosses a line of nodes which is coplanar with the z-axis of the spacecraft. Further, the point B is oriented 180° from the point A. Thus, the point B is on an opposite side of the orbit from the point A. Assuming that the geosynchronous orbit around the earth is of about a 24 hour duration, then the distance between the points A and B would represent a 12 hour difference along the spacecraft's orbital path. By firing the thrusters 4 and 5 at points which represent the 12 hour difference along the spacecraft's orbital path, radial effects in the change of velocity are effectively cancelled. The cancelling effect is apparent upon an examination of the components of the change in velocity.

Figure 4:
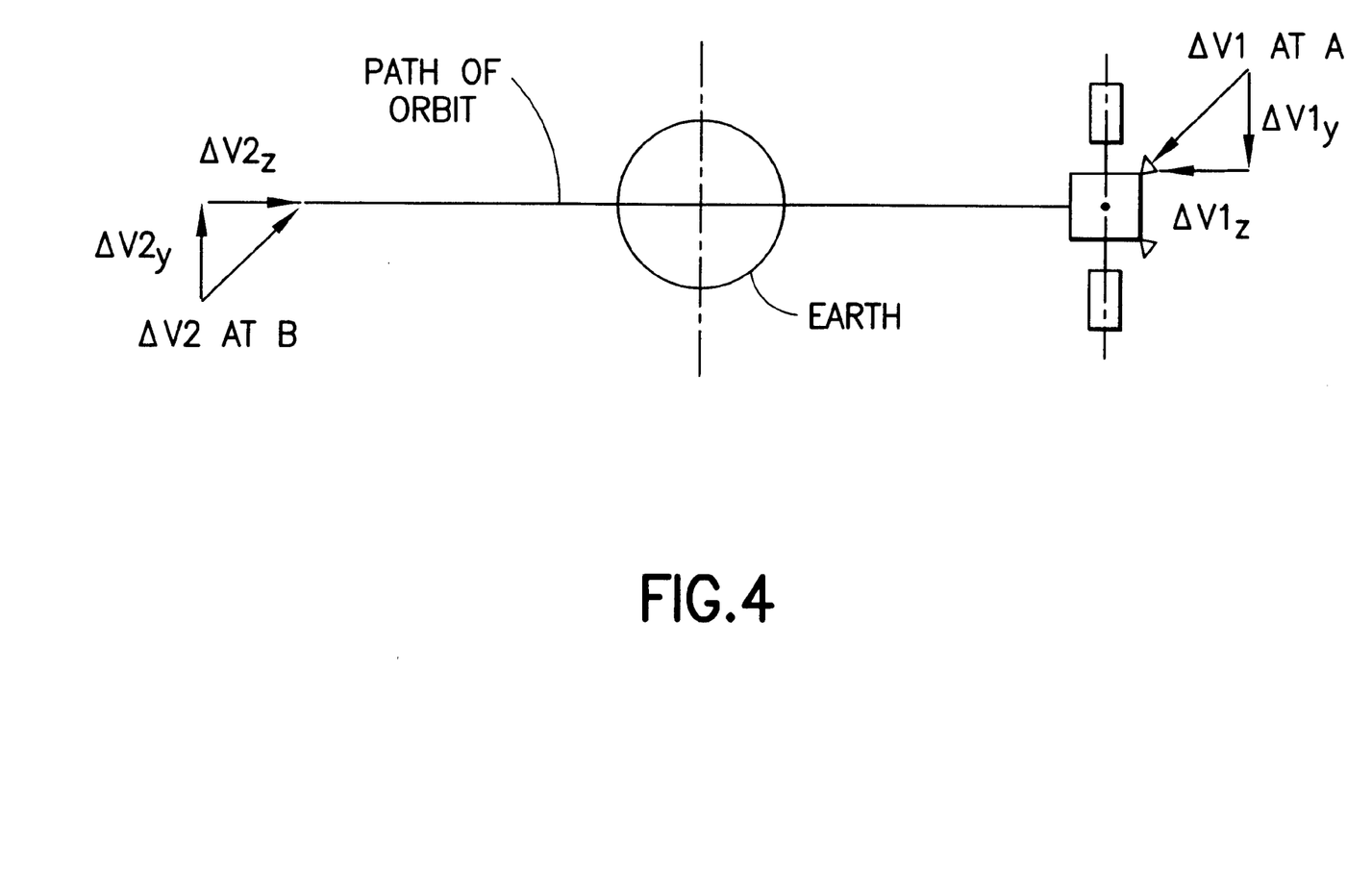
FIG. 4 is a side view of the spacecraft's geosynchronous orbit about the earth in accordance with the present invention.

Referring to FIG. 4, the components of the change in velocity due to the firing of the first thruster 4 and the second thruster 5 at points A and B are illustrated. As shown, both thrust vectors $\Delta V1$ and $\Delta V2$ yield thrust vector components along the y-axis and the z-axis, $\Delta V1_y$, $\Delta V1_z$, $\Delta V2_y$, and $\Delta V2_z$, respectively. Of note, the y-axis components, $\Delta V1_y$ and $\Delta V2_y$, are reversed. That is, the y-axis component of thrust vector $\Delta V1$ produces a southward change in velocity, while the y-axis component of thrust vector $\Delta V2$ produces a northward change in velocity. The reverse, or opposite, components of velocity are a direct result of the alignment of the thrusters 4 and 5 with respect to the spacecraft's center of mass. Since the first thruster 4 is mounted adjacent the north face 7 of the spacecraft 1, the $\Delta V1$ thrust vector, when fired in the direction of the center of mass, produces a south component. Similarly, the second thruster 5 is mounted adjacent the south face 8 of the spacecraft 1 and produces a north component when fired in the direction of the center of mass.

During firing, the thrusters 4 and 5 are preferably gimballed (as discussed above) to null disturbance torques and relieve two axes of wheel momentum accumulation. Thus, the orientation of the thrust vectors and the firing at opposite intervals along the spacecraft's geosynchronous orbit about the earth (at points A and B) enables 2-axes of inertial momentum to be relieved, i.e. desaturated, from the momentum wheel stabilization system. However, and in accordance with the present invention, 3-axis momentum management is realized by modifying the timing of the thruster firings.

Referring again to FIG. 3, points A', B', A", and B" are now emphasized. As discussed above, the thrusters 4 and 5 are fired at collinear points (A and B with the earth's center, i.e. point O) along the spacecraft's orbital path. As such, radial effects of the thrust vectors are cancelled and momentum is dumped in two of the three spacecraft axes. In accordance with the present invention, however, the thrusters 4 and 5 are fired within a thruster firing cycle in which, at various points, firing occurs at offset, non-collinear points along the spacecraft's orbital path. That is, the firing of the thrusters 4 and 5 is offset so that 3-axis momentum control is realized and the radial effects of the thrust vectors are cancelled over, for example, two orbits.

As is illustrated in FIG. 3, the north-south stationkeeping on a first orbit is offset to points A' and B'. The points A', B' and O (the earth's center) are offset from, i.e., are not collinear with, the collinear firing points A, B and O by a first angle $\theta_1$ and a second angle 62, respectively. Firing the first thruster 4 at the point A' and then firing the second thruster 5 at the point B' ensures that the thrust vectors ($\Delta V1$ and $\Delta V2$) are not parallel. Since the thrust vectors are not parallel, 2-axis momentum control by the second thruster 5 at the point B' desaturates momentum that was unaffected by the firing of the first thruster 4 at point A'. The offset firing of the thrusters during this first orbit, however, does not result in the cancellation of the radial components of the change in velocity due to the firing of the first thruster 4 and the second thruster 5. To cancel the radial components of the change in velocity a second firing of each of the thrusters is required. The second firings of the thrusters 4 and 5 are performed at points A" and B", respectively. The points A", B" and O are offset from the collinear firing at the points A, B and O by a third angle $\theta_3$ and a fourth angle $\theta_4$, respectively. It is noted that the points A" and B" are offset an equal and opposite way from the first pair of thruster firings at points A' and B'. In other words, angle $\theta_1$ is equal to angle $\theta_4$ and angle $\theta_2$ is equal to angle $\theta_3$. By repeating the above thruster firing cycle all 3-axes of wheel momentum are desaturated.

In accordance with a thruster firing cycle 20 of the present invention, north-south stationkeeping and 3-axis momentum management are simultaneously provided. The thruster firing cycle 20, illustrated in FIGS. 5A–5D, is accomplished by varying the pattern of the firing of the first thruster 4 and the second thruster 5 according to the steps outlined in the flow chart of FIG. 6.

Figure 5A:
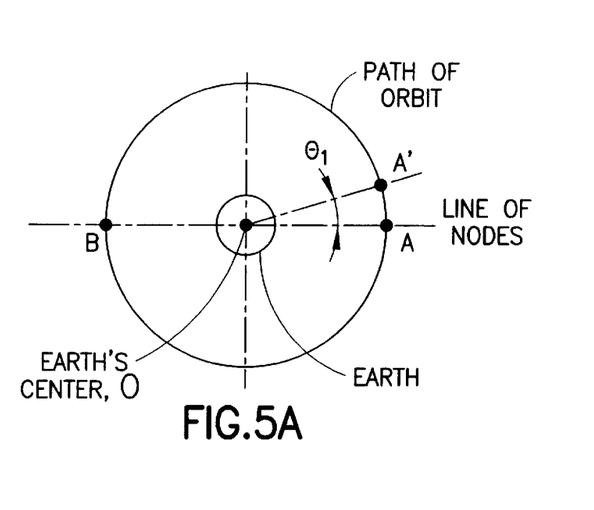
FIGS. 5A–5D are plan views of the spacecraft's geosynchronous orbit about the earth in which are illustrated two successive passes of a thruster firing cycle in accordance with an aspect of this invention.
Figure 6:
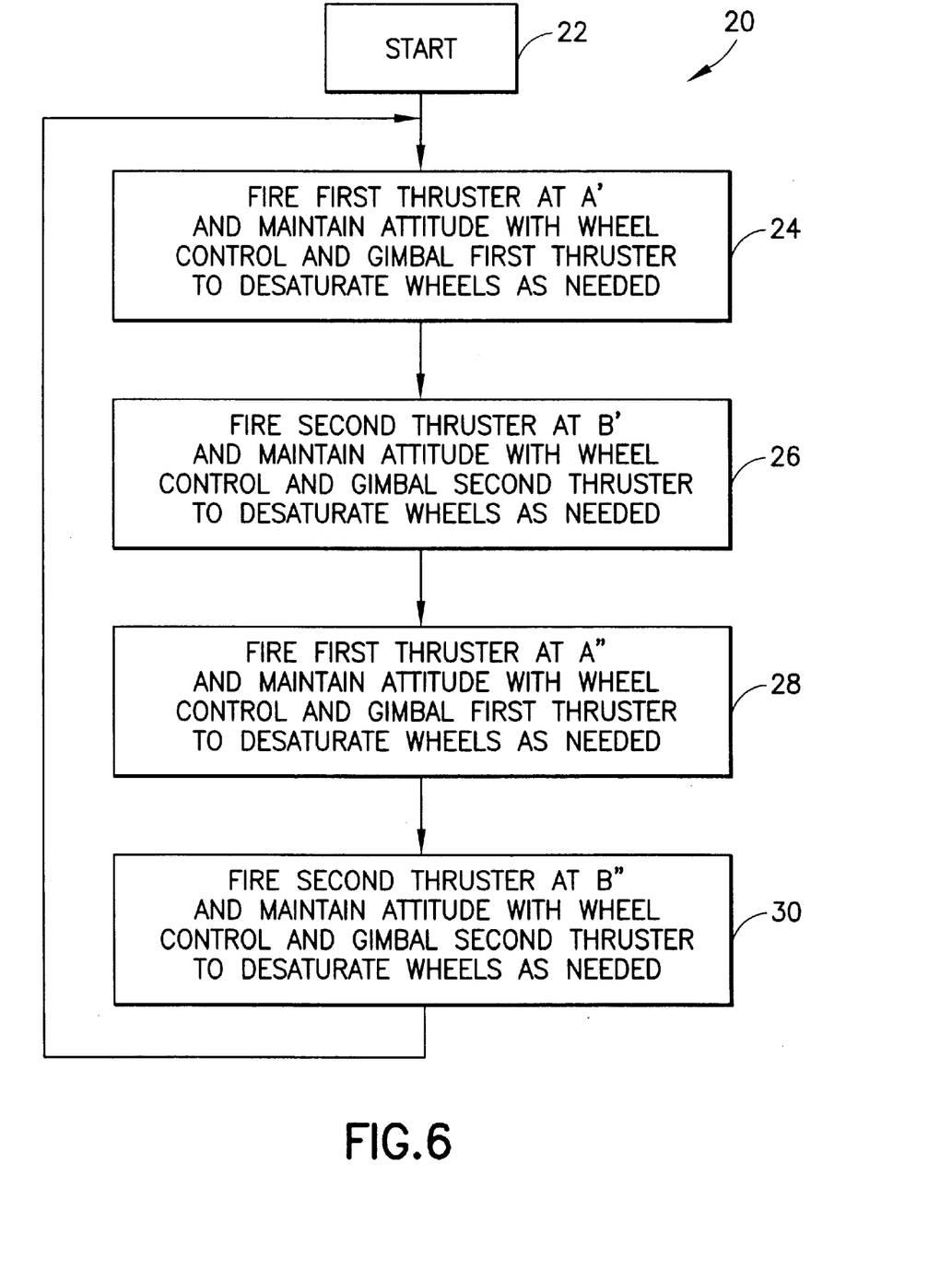
FIG. 6 is a logic flow diagram of the two successive passes of the thruster firing cycle performed in accordance with the present invention.

At Block 22 of FIG. 6 the thruster firing cycle 20 begins. In a first step and during a first orbit, the first thruster 4 is fired (Block 24) at the point A' while maintaining attitude with wheel control and gimballing the first thruster to desaturate momentum wheels as needed. Preferably, the point A' is a first predetermined angle from the point A ($\theta_1$), or a first predetermined time of motion from the point A (FIG. 5A). In one embodiment, the first predetermined angle ($\theta_1$) is about 15° and the first predetermined time of motion is about 1 hour of motion from the point A.

Figure 5B:
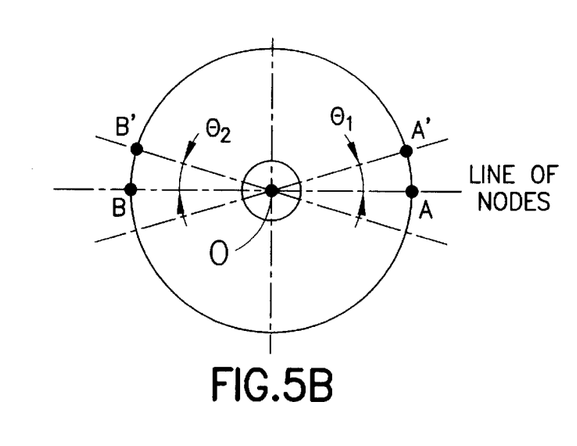

At Block 26, the second thruster 5 is fired. The firing of the second thruster 5 occurs at the point B' which, preferably, is a second predetermined angle from the point B ($\theta_2$) and a second predetermined time of motion from the point A'. The firing of the second thruster occurs while maintaining attitude with wheel control and gimballing the second thruster to desaturate momentum wheels as needed. In one embodiment, the second predetermined angle ($\theta_2$) is about 15° from the point B and the second predetermined time of motion is about 10 hours of motion from the point A'. It is particularly noted that, in accordance with the present invention, the points A', B' and O are non-collinear (FIG. 5B). Since the points A', B' and O are non-collinear, the radial components of the change of velocity produced upon the firing of the first and the second thrusters 4 and 5 are not cancelled. Additionally, since the points A', B' and O are non-collinear, the components of the velocity vectors produced by the firing of the first thruster 4 at the point A' and the firing of the second thruster 5 at the point B' desaturate momentum stored along differing thrust vector directions in inertial space.

Figure 5C:
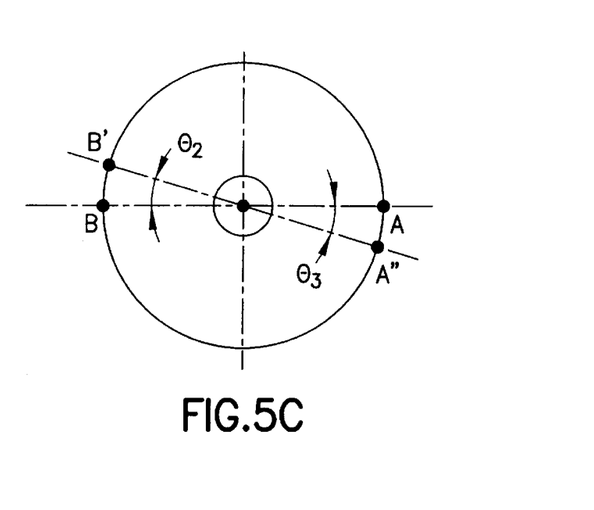

At Block 28, a second pair of thruster firings are begun in order to cancel the effects of the radial components of the change of velocity produced by the first pair of firings of the first and the second thrusters 4 and 5. At Block 28, the first thruster 4 is again fired. The second firing of the first thruster 4 occurs at the point A" (FIG. 5C). The point A" is a third predetermined angle from the point A ($\theta_3$), or a third predetermined time of motion from the point B' such that the points B', A" and O are collinear. As a result of the second firing of the first thruster 4 at the point A", the radial components of the change of velocity produced by the first firing of the second thruster 5 at the point B' are cancelled. In one embodiment, the third predetermined angle ($\theta_3$) is about 15° from the point A and the third predetermined time of motion is about 12 hours of motion from the point B'.

Figure 5D:
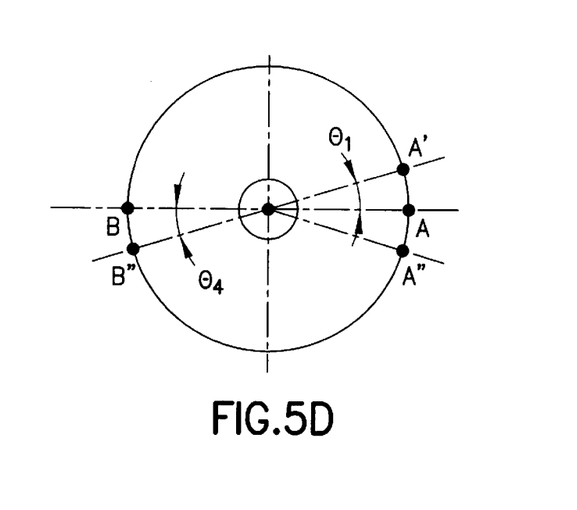

Similarly, at Block 30, the second thruster 5 is again fired. The second thruster 5 is now fired at the point B" (FIG. 5D). The point B" is a fourth predetermined angle from the point B ($\theta_4$), and a fourth predetermined time of motion from the point A' such that the points B", A' and O are collinear. As a result of the second firing of the second thruster 5 at the point B", the radial components of the change of velocity produced upon the first firing of the first thruster 4 at point A' are cancelled. Preferably, the fourth predetermined angle ($\theta_4$) is about 15° from the point B and the fourth predetermined time of motion is about 14 hours of motion from the point A".

As is demonstrated above, the thruster firing cycle 20 achieves both 3-axis momentum control and balanced north-south stationkeeping while producing no radial velocity change effect with two pairs of thruster firings performed over, for example, two orbits of the spacecraft.

In accordance with the present invention, differing values for the predetermined angles ($\theta_1$, $\theta_2$, $\theta_3$ and $\theta_4$) and the predetermined times of motion from points A' to B', B' to A" and A" to B" can be calculated on-board and/or received by ground commands 12 from the ground station 10. As such, the predetermined angles and times of motions can be modified prior to the start of a thrust firing cycle to account for changing orbital mechanics and/or fuel optimization considerations.

Although described in the context of preferred embodiments, it should be realized that a number of modifications to these teachings may occur to one skilled in the art. By example, and as discussed above, the teachings of this invention are not intended to be limited to any specific predetermined angles and/or predetermined times of motion between the alternating firings of the thrusters in the thruster firing cycle disclosed in the present invention.

Thus, while the invention has been particularly shown and described with respect to preferred embodiments thereof, it will be understood by those skilled in the art that changes in form and details may be made therein without departing from the scope and spirit of the invention.

What is claimed is:

1. A method for providing simultaneous north-south stationkeeping and momentum management in a three axis momentum wheel stabilized spacecraft, comprising steps of:

firing a selected one of a plurality of thrusters at opposing points in an orbital path of the spacecraft so as to effectively cancel radial effects in a change of velocity; and while firing the selected one of the plurality of thrusters, gimballing the thruster to null disturbance torques and desaturate wheel momentum accumulation.

2. A method as in claim 1, wherein the step of gimballing sets an orientation of thrust vectors along the spacecraft's orbit to enable two axes of inertial momentum to be desaturated from the momentum wheel stabilization system and, by setting the timing of thruster firings, enables three axis momentum management to be achieved.

3. A method of simultaneous north-south stationkeeping and 3-axis momentum management for a geosynchronous orbiting spacecraft having a first thruster, a second thruster, and at least three momentum wheels mounted on-board the spacecraft, the method comprising steps of:

in a first-pass of a thruster firing cycle, firing the first thruster at a first point along an orbital path of the spacecraft;

firing the second thruster at a second point along the orbital path of the spacecraft, wherein a thrust vector at the second point is non-planar with a thrust vector at the first point;

in a second-pass of the thruster firing cycle, firing the first thruster at a third point along the orbital path of the spacecraft, wherein a thrust vector at the third point is parallel with and on an opposite side of the orbital path from the thrust vector at the second point; and firing the second thruster at a fourth point along the orbital path of the spacecraft, wherein a thrust vector at the fourth point is parallel with and on an opposite side of the orbital path from the thrust vector at the first point;

wherein when the first and the second thrusters are fired at the first, the second, the third and the forth points on the orbital path radial components of a change in velocity produced by firing the first and the second thrusters are cancelled and angular momentum stored in the at least three momentum wheels is desaturated.

4. The method of simultaneous north-south stationkeeping and 3-axis momentum management as set forth in claim 3, wherein the first-pass and the second-pass of the thruster firing cycle are performed over two spacecraft orbits.

5. The method of simultaneous north-south stationkeeping and 3-axis momentum management as set forth in claim 3, wherein the angular momentum stored in the at least three momentum wheels is desaturated by firing at a given time a single thruster to decrease the speed of the at least three momentum wheels along a respective spacecraft axis.

6. A method of simultaneous north-south stationkeeping and 3-axis momentum management for a geosynchronous orbiting spacecraft having a first thruster, a second thruster, and at least three momentum wheel mounted on-board the spacecraft, the method comprising steps of:

defining a point A along an orbital path of the spacecraft wherein the orbital path crosses a line of nodes coplanar with a z-axis of the spacecraft;

defining a point B along the orbital path of the spacecraft wherein the orbital path crosses the line of nodes and wherein the point B is oriented 180° from the point A;

in a first-pass of a thruster firing cycle, firing the first thruster at a point A' along the orbital path of the spacecraft, wherein the point A' is a first predetermined angle from the point A;

firing the second thruster at a point B' along the orbital path of the spacecraft, wherein the point B' is a second predetermined angle from the point B and a second predetermined time of motion from the point A', and wherein the point B' is non-collinear with the point A' and a point O at the earth's center;

in a second-pass of the thruster firing cycle, firing the first thruster at a point A" along the orbital path of the spacecraft, wherein the point A" is a third predetermined angle from the point A and a third predetermined time of motion from the point B', and wherein the point A" is collinear with and on an opposite side of the orbital path from the point B' and the point O; and firing the second thruster at a point B" along the orbital path of the spacecraft, wherein the point B" is a fourth predetermined angle from the point B and a fourth predetermined time of motion from the point A", and wherein the point B" is collinear with and on an opposite side of the orbital path from the point A' and the point O;

wherein when the first and the second thrusters are fired at points A', B', A" and B" on the orbital path, radial components of a change in velocity produced by firing the first and the second thrusters are cancelled and angular momentum stored in the at least three momentum wheels is desaturated.

7. The method of simultaneous north-south stationkeeping and 3-axis momentum management as set forth in claim 6, wherein values of the first, the second, the third and the fourth predetermined angles and the first, the second, the third and the fourth predetermined times of motion within the thruster firing cycle are programmable.

8. The method of simultaneous north-south stationkeeping and 3-axis momentum management as set forth in claim 7, wherein the programmable values are transmitted to the spacecraft from a ground station.

9. The method of simultaneous north-south stationkeeping and 3-axis momentum management as set forth in claim 6, wherein:

the first predetermined angle is about 15° from the point A;

the second predetermined angle is about 15° from the point B and the second predetermined time of motion is about 10 hours from the point A';

the third predetermined angle is about 15° from the point A in a direction opposite the point A' and the third predetermined time of motion is about 12 hours from the point B'; and the fourth predetermined angle is about 15° from the point B in a direction opposite the point B', and the fourth predetermined time of motion is about 14 hours from the point A".

10. A system for simultaneous north-south stationkeeping and 3-axis momentum management for a geosynchronous orbiting spacecraft, said spacecraft having a center of mass, a north face, a south face and an anti-earth side facing opposite earth during said geosynchronous orbit, said system comprising:

a first thruster mounted on said anti-earth side of said spacecraft and adjacent to said north face of said spacecraft, wherein said first thruster is aligned to produce a first thrust vector slightly off from said center of mass;

a second thruster mounted on said anti-earth side of said spacecraft and adjacent to said south face of said spacecraft, wherein said second thruster is aligned to produce a second thrust vector slightly off from said center of mass; and at least three momentum wheels mounted on-board said spacecraft for maintaining an orbital attitude of said spacecraft with respect to a corresponding one of three orthogonal spacecraft axes, wherein said at least three momentum wheels are non-planar such that angular momentum of said corresponding one of said three spacecraft axes is independently stored in at least one of said at least three momentum wheels;

wherein said angular momentum stored in said each of said at least three momentum wheels is desaturated by firing at a given time a single one of said first or said second thruster to desaturate said stored angular momentum, the first thruster and the second thruster being alternatively fired at least at a pair of noncollinear points with the earth's center along an orbital path of the spacecraft.

11. The system for simultaneous north-south stationkeeping and 3-axis momentum management as set forth in claim 10, wherein said system further comprises:

a controller for determining an attitude adjustment in said north-south direction of said geosynchronous orbit of said spacecraft and for producing an attitude adjustment control signal, and for determining if any of said at least three momentum wheels are saturated and for producing a desaturation control signal;

wherein said first thruster and said second thruster are responsive to said attitude adjustment control signal and said desaturation control signal for maintaining a predetermined orbital position along said geosynchronous orbital path of said spacecraft.

12. A method of simultaneous north-south stationkeeping and 3-axis momentum management for an orbiting spacecraft having a first thruster, a second thruster, and at least three momentum wheels mounted onboard the spacecraft for storing angular momentum in a corresponding one of three orthogonal spacecraft axes, the method comprising steps of:

alternatively firing the first thruster and the second thruster at a first pair of non-collinear points with the earth's center along an orbital path of the spacecraft; and alternatively firing the first thruster and the second thruster at points along the orbital path of the spacecraft that are collinear with and on an opposite side of the orbital path from the first pair of non-collinear points and the earth's center;

wherein there is simultaneously provided a desired change in velocity of the spacecraft in the north-south direction and a desaturation of the angular momentum stored in the momentum wheels.

* * * * *